Aug. 1, 1961  J. A. GAYLORD  2,994,231
RELEASING AND ACTUATOR DEVICES FOR SURVIVAL KITS
Filed Aug. 12, 1957  2 Sheets-Sheet 1

INVENTOR.
JOHN A. GAYLORD
BY George B White
ATTORNEY.

Aug. 1, 1961  J. A. GAYLORD  2,994,231
RELEASING AND ACTUATOR DEVICES FOR SURVIVAL KITS
Filed Aug. 12, 1957  2 Sheets-Sheet 2
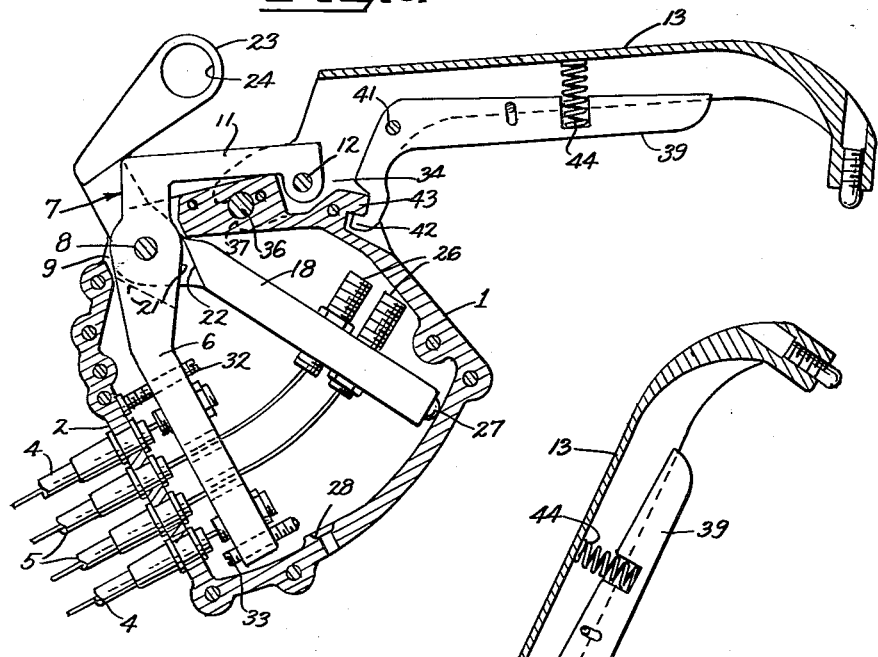
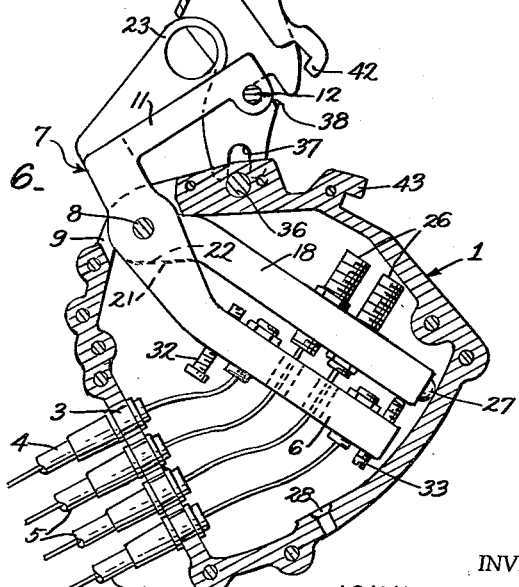
INVENTOR.
JOHN A. GAYLORD
BY George B. White
ATTORNEY United States Patent Office
2,994,231
Patented Aug. 1, 1961

2,994,231
RELEASING AND ACTUATOR DEVICES FOR SURVIVAL KITS
John A. Gaylord, San Rafael, Calif., assignor to H. Koch & Sons, Corte Madera, Calif., a partnership
Filed Aug. 12, 1957, Ser. No. 677,549
7 Claims. (Cl. 74—471)

This invention relates to releasing and actuator devices for survival kits of the type utilized by aircraft personnel.

One of the problems in the escape of aircraft personnel from the aircraft by parachute is the manipulating of the survival kit at a desired altitude. As the aircraft personnel escapes from an aircraft, at a comparatively high altitude, the survival kit hangs from parachute straps below the seat of the person. When the parachute lowers the personnel to an altitude low enough for the approach of a landing space, then it is vital for the person to quickly and positively release the survival kit from the parachute suspension so as to set into operation the various items necessary for survival. Usually such survival kits contain an inflatable raft and other accessories. Fumbling or delay in releasing such a kit can be fatal to the person.

The primary object of the invention is to provide an improved manipulating mechanism for pulling the lines which release a survival kit and also sets into operation various survival accessories in the kit.

Particularly it is an object of the invention to provide an elongated handle with suitable leverage for easy manipulation and positive engagement between two sets of lines for releasing a survival kit and actuating mechanisms therein so that the two sets of lines may be set into action together or one set may be actuated separately and independently of the other.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 5 is a sectional view showing the finger release operating the upper crank for two lines only.

FIG. 6 is a sectional view showing the handle lifted operating all the lines.

Figure 1:
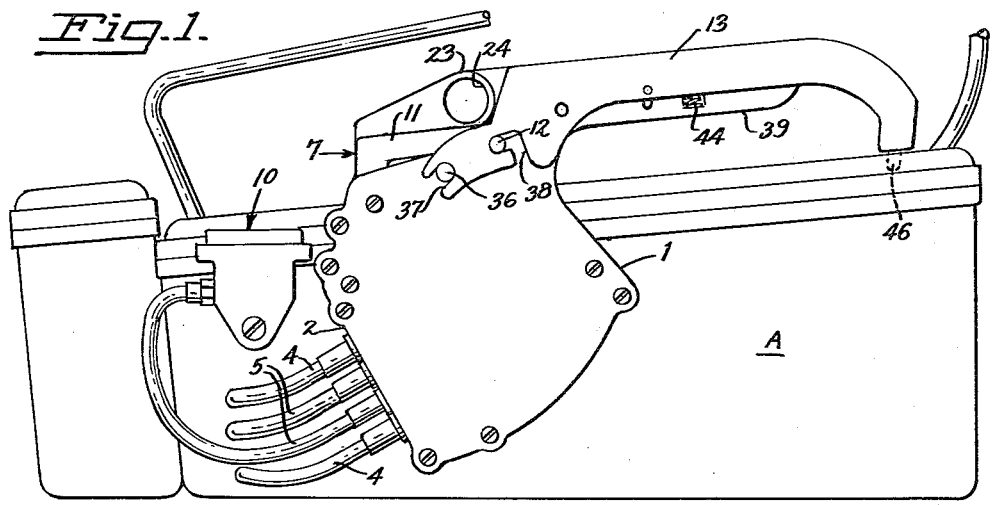
FIG. 1 is a side view of my device in position on a kit.
Figure 2:
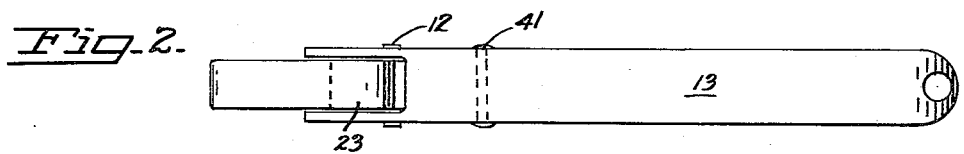
FIG. 2 is a somewhat diagrammatic top plan view of my handle device.
Figure 3:
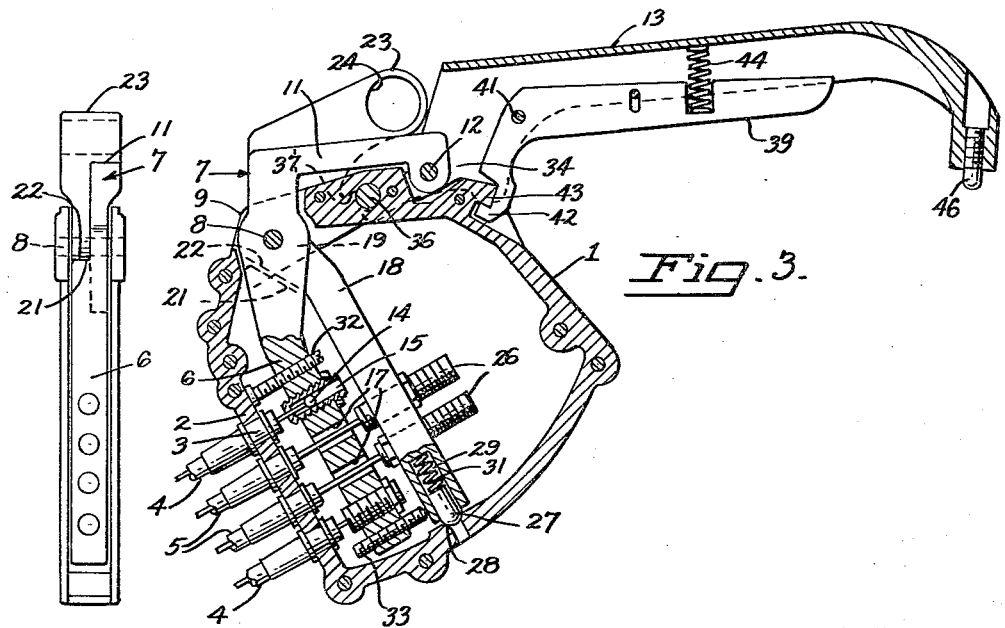
FIG. 3 is a sectional view of my handle and line-manipulator device.
Figure 4:
FIG. 4 is an edge view of the casing and the lines under the handle.

In carrying out my invention I provide a suitably shaped housing 1 which is adapted to be mounted on the usual side of survival kit casing A. Through a wall 2 of this housing 1 extend through suitable bushings two sets of lines 4 and 5. Lines 5 lead through the adjacent wall of the survival kit A to certain mechanisms contained within the survival kit which must be actuated or set into operation under certain conditions. For instance, in the present instance one of the lines 5 would actuate a releasing mechanism for the usual oxygen line and radio connections contained in the kit (not shown in detail) and the other line would open the valve of the usual compressed air tank for the inflation of the usual life raft contained in the survival kit during the descent. Releasing mechanisms for oxygen lines, radio connections and life raft being well known in the art and are not shown in detail. The lines 5 are connected to certain releasing devices known in the art, such as the releasable suspension device 10, for disconnecting the kit from the usual suspension from the parachute, shown in FIG. 1, thereby to permit the free dropping of the kit away from the person. The operation of the release mechanisms in some instances is shown in my co-pending application for Releasable Suspension Lock for Aerial Survival Kits and the Like, Serial No. 677,690, filed August 12, 1957, and such operation would also permit the person in the plane to rise from his seat without lifting the survival kit with him and without operating any of the devices in the kit. In either case the mechanism hereinafter described provides for positive pulling of the lines 5 independently of the other lines or for the pulling of all the lines together.

Inside of the housing 1 and parallel with the wall 2 is provided an arm 6 of a bell crank 7. This bell crank is supported on a pivot 8 extended transversely across a suitable opening 9 in the top wall of the housing 1 so as to permit the pivoting of the arm 6. An upper lever arm 11 extends at an angle along the top wall of the housing 1 and is connected by a crosspin 12 to an elongated handle 13. The end of each of the lines 4 is suitably anchored by means of a small ball 14 in a socket 15 screwed into the bell crank arm 6 so as to hold the end of the lines 4 in adjusted position. Thus as the upper arm 11 of the bell crank 7 is turned or lifted by the handle 13 about the pivot 8, it will raise the bell crank arm 6 to the position shown in FIG. 6, and thereby the lines 4 are pulled by the bell crank so as to set into action the devices contained within kit A as heretofore mentioned to be operated by the lines.

The other lines 5, which are for detaching or releasing the survival kit from the parachute strap or hanger, extend through suitable holes 17 through bell crank arm 6 so as to enable them to be pulled separately by another actuator lever. For this purpose there is provided a second bell crank arm 18 also pivoted on the same pivot pin 8. The hub 19 of this second bell crank arm 18 and the hub 9 of the first bell crank lever 7 have interlocking recesses so that shoulders 21 of the first bell crank lever 7 can bear against the adjacent walls 22 of the hub of the second bell crank arm 18 and lift the second bell crank arm 18 whenever the bell crank 7 is turned, but allow the second bell crank arm 18 also to move separately.

A finger 23 extends at an angle from the top of the second bell crank arm 18 above the pivot 8 generally above and along the upper arm 11 of the first bell crank 7 and forms the outer arm of the second bell crank. This finger 23 overlies the top of the upper arm 11 of the first bell crank 7 and has in its extreme end a comparatively larger finger hole 24 to be engageable by a finger or thumb of the person wearing the kit.

The detaching lines 5 are anchored similarly to the previous anchors in screw sockets 26 adjustably secured in the upper or second bell crank arm 18 so that the raising of the second bell crank arm 18 can pull the lines 5 separately and independently of the lines 4.

In order to prevent accidental release of the kit from its hanging strip a spring pressed catch 27 engages a recess 28 in the wall of the housing 1. This catch 27 is in a socket 29 in the end of the second bell crank arm 18, and a coil spring 31 normally urges the catch 27 into the recess 28 and thereby to hold the second bell crank 18 in position until force is applied through the finger 23 for the separate operation of the second set of lines 5.

The position of the first bell crank 7 is determined by a set screw 32 the head of which abuts against the inside of the wall 2 of the housing 1 so as to determine the initial position of the first bell crank 7. The position of the second bell crank arm 18 is adjustably determined by another set screw 33 which is threaded into the free end of the bell crank arm 6 of the first bell crank 7 and abuts against the underside of the second bell crank arm 18 thereby to determine the initial position of the two bell crank arms relatively to one another.

The manipulating handle 13 is of the same type as described in my said copending application. The handle 13 is elongated forwardly in order to provide suitable leverage and its hub 34 bears against a pivot pin 36 by means of an open socket 37 so that the entire handle 13 may be freed after the manipulation, namely after it is lifted up. For this purpose, the pin 12 in the end of the bell crank arm 11 is engaged in a bayonet slot 38 so that after the actuation the pin 12 can escape from the bayonet slot 38 and leave the handle free.

A grip handle 39 is pivoted on a pivot 41 on the underside of the handle 13 and has on it a hook 42 to engage a keeper 43 on the outside of the housing 1 for the purpose of normally holding the handle 13 in its horizontal or inoperative position. A coil spring 44 urges the grip handle 39 into this handle locking position.

A locating pin 46 in the free end of the handle 13 is adapted to engage a suitable hole in the survival kit not shown.

In operation the person grips the handle 13 and the grip handle 39 and presses them together so as to release the hook 42 from keeper 43. Then by lifting the handle 13 the cross pin 12 is lifted thereby to raise the crank arm 11 and turn the lower bell crank 7 about its pivot 8. By reason of the engagement of the top arm 11, with the finger 23 as well as the shoulder 21 with the bottom 22 of the hub of the upper crank arm 18 and the engagement of the set screw 33 with the outer end of the second bell crank arm 18, as the bell crank arm 16 is lifted, it lifts with it the upper bell crank arm 18 and thereby operates both sets of lines 4 and 5 for detaching the kit from the parachute hanger strap and also to actuate the inflation of the raft and the detachment of the oxygen connection simultaneously.

It is to be noted, that in well known practice when the kit is so detached, it still hangs on a lanyard which causes the pulling of the lid off the body of the kit thereby to permit the inflation of the raft conveniently at a predetermined distance beneath the person suspended on its parachute.

In the event the pilot wants to detach the kit while in the plane, then the pilot engages the finger hole 24 and pulls the finger 23 up thereby moving only the second bell crank arm 18 upwardly away from the other crank arm 6 so as to pull only the second set of lines 5 which actuate the strap releasing mechanism and the detachment from the kit so that the person can rise and leave the kit in the seat.

The advantage of this device is that it prevents accidental release yet it operates positively and quickly with a minimum exertion of force when it is needed. It is vital for the saving of a pilot that the survival kit be manipulated easily and quickly when needed and the mechanism herein described accomplishes that purpose with positiveness, yet it does not permit accidental disengagement or release or actuation of the components of the survival kit.

I claim:

1. In a manipulating device for an aerial survival kit, a housing adapted to be secured to said kit, a plurality of pulling lines passed through a side of the housing, a first lever pivoted on the housing and being turnable away from said side, a certain of said pulling lines being connected to said first lever so as to be pulled thereby, a second lever pivoted on said housing in spaced relation to said first lever so that said first lever is generally between said second lever and said side, said second lever being turnable away from said side and from said first lever, the remaining pulling lines being connected to said second lever so as to be pulled thereby, a handle pivoted on said housing, an arm extended from the pivoted end of said first lever and connected to said handle so as to turn said first lever away from said side for pulling said certain pulling lines when said handle is turned away from said housing, abutting elements on said first lever abutting said second lever to turn said second lever when said first lever is turned away from said side for pulling all of said pulling lines simultaneously, and a separate manipulating element on the pivoted end of said second lever for turning said second lever away from said abutting elements for pulling said remaining pulling lines independently of said certain pulling lines.

2. In a manipulating device for pulling actuating lines of an aerial survival kit, said lines extending through a side of a housing, and said housing being adapted to be secured to said kit; the improvement of generally parallel levers pivoted for turning away from said side, certain actuating lines being connected to one lever and the remaining actuating lines being connected to the other lever so as to be pulled when the respective levers are turned away from said side, said one lever being nearer to said side than said other lever, abutment elements between said levers to turn said other lever with said first lever but to permit said other lever to turn away from said side and from said one lever for pulling said remaining pulling lines only, a handle outside of said housing connected to said one lever for turning said one lever away from said side thereby to pull all actuating lines together, and a manipulating element on the other lever manipulable independently of said handle for turning said other lever away from said one lever thereby to pull said remaining actuating lines only.

3. The manipulating device, defined in claim 2, wherein said levers are in parallel registering position and said one lever has passages for said remaining actuating lines therethrough.

4. The manipulating device as defined in claim 3, wherein one of said abutment elements is adjacent the pivots of said levers, and another abutment element adjustably extending from said one lever into abutment with said other lever, and adjustable anchoring means for connecting each line to the respective levers.

5. In a manipulating device for pulling actuating lines of an aerial surviving kit, including pivoted pulling levers in a housing secured to the kit to which said lines are connected, the improvement of a handle outside said housing for manipulating said lines, a grip pivoted on the handle and being generally parallel with said handle to be gripped together with the handle, means to normally interlock said grip with said housing to restrain movement of said handle, said interlocking means being releasable when said grip is pressed toward said handle, a handle pivot on said housing, said handle having an open slot engaging said handle pivot so as to bear against said handle pivot when the handle is turned and to disengage from said handle pivot after said handle is turned beyond a predetermined pulling position, a crank arm extended from at least one of said levers to said handle, a pivot and bayonet slot connection between said crank arm and said handle so arranged as to turn said crank arm for turning said pulling levers and to free said handle from said crank arm beyond said predetermined position of said handle so as to free said handle from said housing and said arms.

6. In a manipulating device for an aerial survival kit a housing, a wall of the housing being adapted to be secured to said kit, a side of said housing extending along an edge of said wall, actuating lines extended through said side, a first lever pivoted on the housing on a pivot axis generally at right angles to said wall so as to be turnable away from said side, a second lever pivoted on said pivot axis and extended generally parallel with said first lever, adjustable anchoring means on said first lever anchoring certain of said lines on said first lever, adjustable anchoring means on said second lever anchoring the remaining lines on said second lever, said levers being spaced from one another in spaced superimposed relation, said first lever being nearer to said side than said second lever, said first lever having passages therethrough, said remaining lines extending through the respective passages to said second lever, adjustable abutment means between said levers for spacing said levers apart and transmitting movement of said first lever to said second lever, a manipulating arm extended at an angle from said first lever outside said housing, a handle pivoted on said housing, a pivot connecting said arm to said handle for turning said arm when said handle is turned so as to move said first lever away from said side and to pull said certain lines, a second arm extended at an angle from said second lever, said second arm being free of said first arm for manipulation independently of said first arm for turning said second lever away from said first lever and pulling said remaining lines only and independently of said certain lines.

7. The device defined in claim 6, wherein said handle pivot and said connecting pivot of said first arm being severable from said housing and from said handle respectively to free said handle after said first crank arm is turned beyond a predetermined actuated position.

References Cited in the file of this patent

UNITED STATES PATENTS

| | | |
|---|---|---|
| 1,269,581 | Fritz et al. | June 18, 1918 |
| 1,588,325 | Martin | June 8, 1926 |
| 1,919,531 | Rosner | July 25, 1933 |
| 2,406,872 | Waite | Sept. 3, 1946 |

FOREIGN PATENTS

| | | |
|---|---|---|
| 241,094 | Switzerland | Feb. 15, 1946 |